US010914980B2

(12) United States Patent
Huang et al.

(10) Patent No.: US 10,914,980 B2
(45) Date of Patent: Feb. 9, 2021

(54) QUANTUM-DOT COLOR FILTER SUBSTRATE AND DISPLAY PANEL

(71) Applicant: Wuhan China Star Optoelectronics Technology Co., Ltd., Wuhan (CN)

(72) Inventors: Chang-Chih Huang, Shenzhen (CN); Chaoqun Yang, Shenzhen (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 206 days.

(21) Appl. No.: 16/207,227

(22) Filed: Dec. 3, 2018

(65) Prior Publication Data

US 2019/0369438 A1  Dec. 5, 2019

Related U.S. Application Data

(63) Continuation of application No. PCT/CN2018/101682, filed on Aug. 22, 2018.

(30) Foreign Application Priority Data

May 30, 2018  (CN) .......................... 2018 1 0538862

(51) Int. Cl.
*G02B 5/20*  (2006.01)
*G02F 1/1335*  (2006.01)

(52) U.S. Cl.
CPC ....... *G02F 1/133514* (2013.01); *G02B 5/201* (2013.01); *G02F 2202/36* (2013.01)

(58) Field of Classification Search
CPC ....... G03F 7/0007; G02B 5/201; G02B 5/206; G02B 5/208; G02F 1/133514; G02F 2202/36
USPC ............................................... 430/7; 349/106
See application file for complete search history.

(56) References Cited

U.S. PATENT DOCUMENTS

| 8,624,846 | B2 | 1/2014 | Fukunaga et al. |
| 10,068,949 | B2 | 9/2018 | Jiang |
| 2015/0318506 | A1 | 11/2015 | Zhou et al. |
| 2016/0033822 | A1 | 2/2016 | Jiang et al. |
| 2016/0033823 | A1 | 2/2016 | Lee et al. |
| 2018/0157083 | A1* | 6/2018 | Yeo ..................... G02F 1/13338 |

FOREIGN PATENT DOCUMENTS

| CN | 105044974 A | 11/2015 |
| CN | 106773312 A | 5/2017 |

* cited by examiner

*Primary Examiner* — John A McPherson

(57) ABSTRACT

A quantum-dot color filter substrate and a quantum-dot liquid crystal display panel are disclosed in the present disclosure. The quantum-dot color filter substrate includes a glass substrate and a quantum-dot light conversion layer formed on the glass substrate and including a plurality of quantum-dot parts arrayed in sequence, wherein the quantum-dot parts include a red quantum-dot part, a green quantum-dot part and a blue quantum-dot part, and the red quantum-dot part and the green quantum-dot part contain infrared quantum-dot materials. In this way, the purity of lights emitted by a color filter can be improved, and displays can be made light and thin.

14 Claims, 2 Drawing Sheets

QUANTUM-DOT COLOR FILTER SUBSTRATE AND DISPLAY PANEL

CROSS REFERENCE TO RELATED APPLICATIONS

The present application is a continuation-application of International (PCT) Patent Application No. PCT/CN2018/101682, filed on Aug. 22, 2018, which claims foreign priority of Chinese Patent Application No. 201810538862.8, filed on May 30, 2018 in the State Intellectual Property Office of China, the entire contents of which are hereby incorporated by reference.

TECHNICAL FIELD

Embodiments of the present disclosure relate to the technical field of liquid crystal displays, in particular to a quantum-dot color filter substrate and a display panel.

BACKGROUND

The continuous development of the display technology has led to increasingly higher requirements of people for the performance of displays, not only in the display effect such as the color gamut, but also in the appearance such as the thickness.

Color filters made from quantum-dot materials can effectively improve the color gamut of LCDs. However, quantum-dot color filters generally adopt blue lights to excite red lights and green lights, and part of the blue lights penetrating through the color filters may reduce the purity of emitted red and green lights, consequentially, decreasing the utilization rate of quantum dots. A barrier layer, used to absorb blue lights in the quantum-dot color filters, has a large thickness, which is unfavorable to miniaturization of LCDs.

The inventor of this application realized, in the long-term research and development process, that the purity of lights emitted by existing color filters is poor, which is unfavorable for making displays light and thin.

SUMMARY

The main technical issue to be settled by the present disclosure is to provide a quantum-dot color filter substrate and a display panel, which can improve the purity of lights emitted by color filters, thus being beneficial for making displays light and thin.

In order to solve the above technical problem, one technical solution adopted by the present disclosure is to provide a quantum-dot color filter substrate, wherein the quantum-dot color filter substrate comprises: a glass substrate; a quantum-dot light conversion layer, wherein the quantum-dot light conversion layer is formed on the glass substrate and comprises a plurality of quantum-dot parts arrayed in sequence, wherein the quantum-dot parts comprise a red quantum-dot part, a green quantum-dot part and a blue quantum-dot part; wherein the red quantum-dot part and the green quantum-dot part comprise infrared quantum-dot materials; each said infrared quantum-dot materials comprises a quantum-dot core and a stabilizer wrapping the quantum-dot core, the quantum-dot core is quantum-dot inorganic matter, and the stabilizer is organic matter; the infrared quantum-dot materials have a diameter of 1-10 nm.

In order to solve the above technical problem, one technical solution adopted by the present disclosure is to provide a quantum-dot color filter substrate, wherein the quantum-dot color filter substrate comprises: a glass substrate; a quantum-dot light conversion layer, wherein the quantum-dot light conversion layer is formed on the glass substrate and comprises a plurality of quantum-dot parts arrayed in sequence, and the quantum-dot parts comprise a red quantum-dot part, a green quantum-dot part and a blue quantum-dot part; wherein the red quantum-dot part and the green quantum-dot part comprise infrared quantum-dot materials.

In order to solve the above technical problem, one technical solution adopted by the present disclosure is to provide a display panel, wherein the display panel comprises a quantum-dot color filter substrate, and the quantum-dot color filter substrate comprises: a glass substrate; a quantum-dot light conversion layer, wherein the quantum-dot light conversion layer is formed on the glass substrate and comprises a plurality of quantum-dot parts arrayed in sequence, and the quantum-dot parts comprise a red quantum-dot part, a green quantum-dot part and a blue quantum-dot part; wherein the red quantum-dot part and the green quantum-dot part comprise infrared quantum-dot materials.

The present disclosure has the following beneficial effects over the prior art: infrared quantum-dot materials are added to certain quantum-dot parts (namely a red quantum-dot part and a green quantum-dot part) to effectively absorb blue lights penetrating through the red quantum-dot part and the green quantum-dot part and serving as a quantum-dot excitation source, so that the purity of red and green lights emitted by a quantum-dot color filter can be improved, and the product quality can also be improved; and meanwhile, since the infrared quantum-dot materials have a good absorption effect on the blue lights serving as the quantum-dot excitation source, there is no limitation in the thickness or consumption on the infrared quantum-dot materials, so that displays can be made light and thin.

DETAILED DESCRIPTION

A clear and complete description of the technical solutions provided by embodiments of the present disclosure is given below with reference to the accompanying drawings. Apparently, the embodiments described below are only certain illustrative ones, but do not include all possible embodiments of the present disclosure. All other embodiments obtained by those ordinarily skilled in this field based on these illustrative embodiments without creative labor should also fall within the protection scope of the present disclosure.

Figure 1:
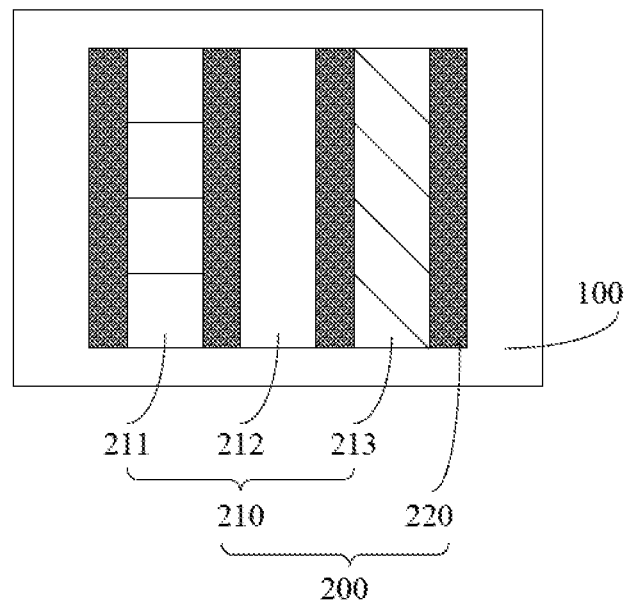
FIG. 1 is a structural view of one embodiment of a quantum-dot color filter substrate of the present disclosure.

Please refer to FIG. 1 which is a structural view of one embodiment of a quantum-dot color filter substrate of the present disclosure. As shown in FIG. 1, the quantum-dot color filter substrate may include:

a glass substrate 100 and a quantum-dot light conversion layer 200, wherein the quantum-dot light conversion layer 200 may be formed on the glass substrate 100 and include a plurality of quantum-dot parts which are arrayed in sequence. The quantum-dot parts can include a red quantum-dot part 211, a green quantum-dot part 213 and a blue quantum-dot part 212, wherein the red quantum-dot part 211 and the green quantum-dot part 213 may include infrared quantum-dot materials.

In this embodiment, the infrared quantum-dot materials added to sub-pixel parts of the quantum-dot parts, namely the red quantum-dot part 211 and the green quantum-dot part 213, can effectively absorb blue lights penetrating through the red quantum-dot part 211 and the green quantum-dot part 213 and serving as a quantum-dot excitation source, so that the purity of red and green lights emitted by a quantum-dot color filter can be improved, and the product quality can be improved; and meanwhile, since the infrared quantum-dot materials have a good absorption effect on the blue lights serving as the quantum-dot excitation source, there is no limitation in the thickness or consumption of the infrared quantum-dot materials, so that displays can be made light and thin.

In one embodiment, the quantum-dot color filter substrate may further include a plurality of black matrices 220 used to separate the sub-pixel parts of the quantum-dot parts from one another, and the black matrices 220 each have a cross section in the shape of an inverted trapezoid.

The infrared quantum-dot materials can be distributed on the red quantum-dot part 211 and the green quantum-dot part 213 in various manners.

Figure 2:
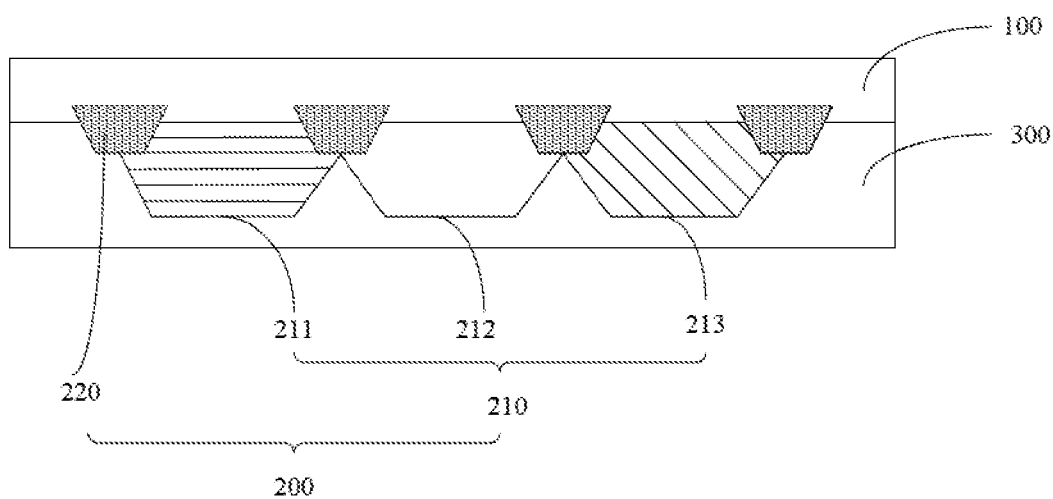
FIG. 2 is a structural view of one embodiment of the cross section of the quantum-dot color filter substrate in FIG. 1.

In one embodiment, referring to FIG. 2 which is a structural view of one embodiment of the cross section of the quantum-dot color filter substrate in FIG. 1, the red quantum-dot part 211 and the green quantum-dot part 213 may include infrared quantum-dot materials, and particularly, the infrared quantum-dot materials can be mixed in raw materials of the red quantum-dot part 211 and raw materials of the green quantum-dot part 213, so that the red quantum-dot part 211 and the green quantum-dot part 213 can be prepared through a coating process or a deposition process.

The quantity of the infrared quantum-dot materials added to the red quantum-dot part 211 and the green quantum-dot part 213 has a significant influence on the absorption effect on the blue lights serving as the quantum-dot excitation source. In order to obtain a good blue light absorption effect and to prevent the infrared quantum-dot materials from agglomeration, which may otherwise effect the stability of the infrared quantum-dot materials, it is necessary to add a proper quantity of infrared quantum-dot materials to the raw materials of the red quantum-dot part 211 and to add a proper quantity of infrared quantum-dot materials to the raw materials of the green quantum-dot part 213. Correspondingly, a mass fraction of the infrared quantum-dot materials in the raw materials of the red quantum-dot part 211 may be 0.1%-20%, such as 0.1%, 1%, 5%, 10% or 20%, and a mass fraction of the infrared quantum-dot materials in the raw materials of the green quantum-dot part 213 may be 0.1%-20%, such as 0.1%, 1%, 5%, 10% or 20%.

Furthermore, referring to FIG. 2 again, the quantum-dot color filter substrate may further include a planarization layer 300 covering the quantum-dot light conversion layer 200. The planarization layer 300 can be made from a transparent material, which can be an epoxy resin high-polymer material or polymethyl methacrylate and is used to improve the surface smoothness of the quantum-dot color filter substrate and to protect the quantum-dot light conversion layer 200.

Figure 3:
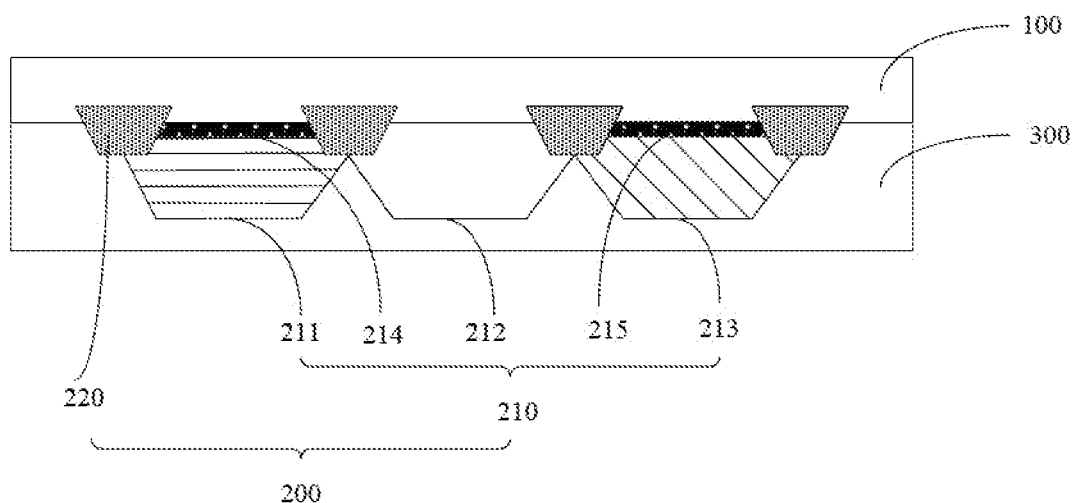
FIG. 3 is a structural view of another embodiment of the cross section of the quantum-dot color filter substrate in FIG. 1.

In another embodiment, referring to FIG. 3 which is a structural view of another embodiment of the cross section of the quantum-dot color filter substrate in FIG. 1, the quantum-dot color filter substrate can further include a first infrared quantum-dot material layer 214 formed between the glass substrate 100 and the red quantum-dot part 211 and a second infrared quantum-dot material layer 215 formed between the glass substrate 100 and the green quantum-dot part 213. Particularly, besides the red quantum-dot part 211 and the green quantum-dot part 213, the first infrared quantum-dot material layer 214 between the glass substrate 100 and the red quantum-dot part 211 and the second infrared quantum-dot material layer 215 between the glass substrate 100 and the green quantum-dot part 213 also include infrared quantum-dot materials. The infrared quantum-dot materials distributed in the red quantum-dot part 211 and the first infrared quantum-dot material layer 214 can better absorb the blue lights serving as the quantum-dot excitation source, thus, improving the purity of emitted red lights. Similarly, the infrared quantum-dot materials distributed in the green quantum-dot part 213 and the second infrared quantum-dot material layer 215 can better absorb the blue lights serving as the quantum-dot excitation source, thus, improving the purity of emitted green lights.

Furthermore, the thickness of the first infrared quantum-dot material layer 214 and the thickness of the second infrared quantum-dot material layer 215 can be adjusted by regulating the concentration and/or granularity of the infrared quantum-dot materials. Particularly, within a certain range, the absorption effect of the infrared quantum-dot materials on the blue lights serving as the quantum-dot excitation source can be gradually improved with the increase of the concentration and granularity of the infrared quantum-dot materials.

Furthermore, in order to obtain a good blue light absorption effect and to decrease the thickness of the quantum-dot color filter substrate, the thickness of the first infrared quantum-dot material layer 214 and thickness of the second infrared quantum-dot material layer 215 may not be over 2 µm, such as 1 µm, 1.2 µm, 1.4 µm, 1.6 µm, 1.8 µm or 2 µm. The thickness of the first infrared quantum-dot material layer 214 and thickness of the second infrared quantum-dot material layer 215 are identical or different. In one embodiment, the thickness of the first infrared quantum-dot material layer 214 and thickness of the second infrared quantum-dot material layer 215 are identical, so that the production process can be simplified, and the production cost can be reduced. Of course, the first infrared quantum-dot material layer 214 and the second infrared quantum-dot material layer 215 can have difference thicknesses according to requirements for the display effect.

Figure 4:
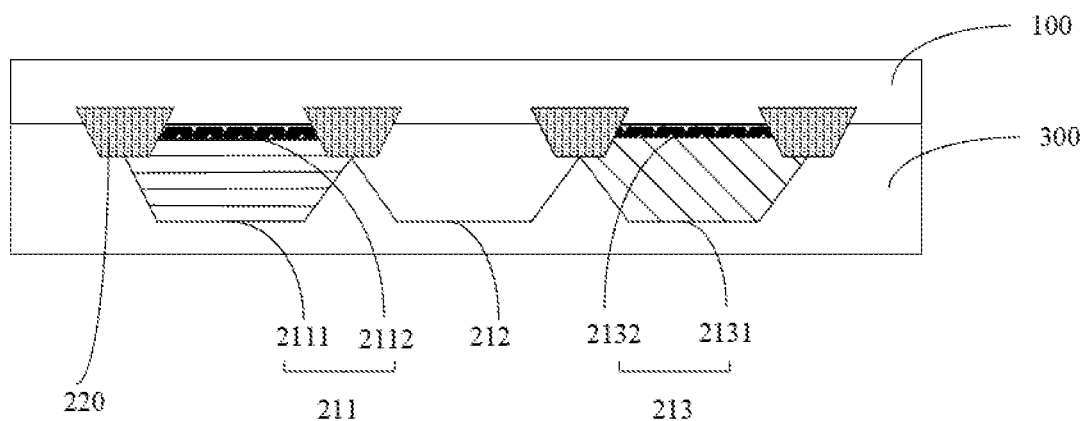
FIG. 4 is a structural view of a third embodiment of the cross section of the quantum-dot color filter substrate in FIG. 1.

In one embodiment, referring to FIG. 4 which is a structural view of a third embodiment of the cross section of the quantum-dot color filter substrate in FIG. 1, the red quantum-dot part 211 may include a first infrared quantum-dot material layer 2112 and a red quantum-dot color layer 2111, and the green quantum-dot part 213 may include a second infrared quantum-dot material layer 2132 and a green quantum-dot color layer 2131. The first infrared quantum-dot material layer 2112 can be formed between the glass substrate 100 and the red quantum-dot color layer 2111. The second infrared quantum-dot material layer 2132 can be formed between the glass substrate 100 and the green quantum-dot color layer 2131.

In another embodiment, infrared quantum-dot materials may be distributed in the red quantum-dot part 211 and the green quantum-dot part 213 in a same manner, so that the preparation process of the quantum-dot color filter substrate can be simplified, and the production efficiency can be improved.

In one embodiment, each infrared quantum-dot material may be of a core-shell structure and include a quantum-dot core and a stabilizer wrapping the quantum-dot core. The quantum-dot core can be quantum-dot inorganic matter, and the stabilizer can be organic matter. Particularly, the quantum-dot core may include one or the combination of more than two selected from Cd, Cu, Ag, Pb, Si and Zn quantum-dot inorganic compounds, and the stabilizer may include one or the combination of more than two selected from mercaptoacetic acid, mercaptoethylamine and cysteine and can be used to stabilize the structure of the infrared quantum-dot materials and to regulate the polarity of the infrared quantum-dot materials.

The granularity of the infrared quantum-dot materials can have a significant influence on the blue light absorption effect due to the fact that infrared quantum-dot materials with different granularities have different absorption spectrums. The absorption spectrum of the infrared quantum-dot materials can be adjusted by adjusting the granularity of the infrared quantum-dot materials so as to enhance blue light absorption and to weaken green and red light absorption, so that the blue lights serving as the quantum-dot excitation source can be effectively absorbed, and the purity of the red and green lights emitted by the quantum-dot color filter can be improved. Furthermore, the infrared quantum-dot materials may have a diameter of 1-10 nm, such as 1 nm, 3 nm, 5 nm, 7 nm, 9 nm or 10 nm.

Of course, in order to obtain different quantum-dot color filter substrates or even different areas of one quantum-dot color filter substrate to better meet the requirements of different users, the infrared quantum-dot materials can be distributed in different manners or can have different granularities and concentrations.

Figure 5:
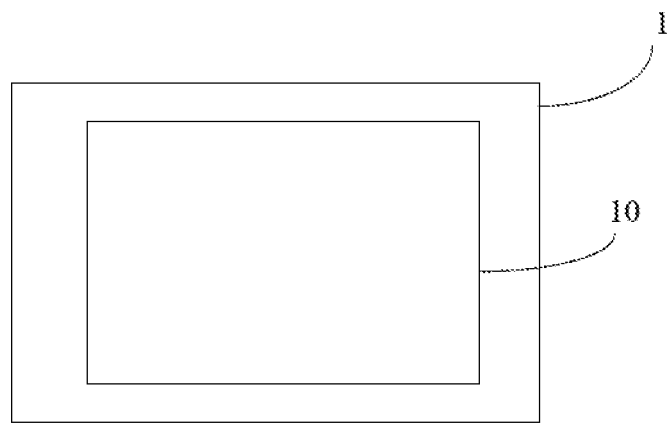
FIG. 5 is a structural view of one embodiment of a display panel of the present disclosure.

Please refer to FIG. 5 which is a structural view of one embodiment of a display panel of the present disclosure. As shown in FIG. 5, the display panel 1 may include the quantum-dot color filter substrate 10 in any one of the embodiments mentioned above. In this embodiment, the display panel 1 is used for manufacturing a quantum-dot liquid crystal display, wherein the quantum-dot liquid crystal display can be applied to terminals such as mobile phones, tablet computers, or televisions. In one embodiment, the quantum-dot liquid crystal display is a television with a large size over 70 inches, such as 88 inches or 108 inches. By adoption of the quantum-dot color filter substrate 10, a good display effect can be obtained, and the large-sized television can be made light and thin and can better meet the requirements of users.

In conclusion, as for the quantum-dot color filter substrate and the quantum-dot liquid crystal display panel disclosed by the present disclosure, the quantum-dot color filter substrate may include the glass substrate and the quantum-dot light conversion layer formed on the glass substrate and comprising the plurality of quantum-dot parts arrayed in sequence, and the quantum-dot parts include the red quantum-dot part, the green quantum-dot part and the blue quantum-dot part, wherein the red quantum-dot part and the green quantum-dot part include the infrared quantum-dot materials. In this way, the purity of lights emitted by a color filter can be improved, and displays can be made light and thin.

The above description is only used to explain certain embodiments of the present disclosure, but is not intended to limit the patent scope of the present disclosure. All equivalent structures or equivalent flow transformations based on the contents in the specification and accompanying drawings, or direct or indirect applications to other relevant technical fields should also fall within the patent protection scope of this disclosure.

What is claimed is:

1. A quantum-dot color filter substrate, wherein the quantum-dot color filter substrate comprises:
   a glass substrate;
   a quantum-dot light conversion layer, wherein the quantum-dot light conversion layer is formed on the glass substrate and comprises a plurality of quantum-dot parts arrayed in sequence, wherein the quantum-dot parts comprise a red quantum-dot part, a green quantum-dot part and a blue quantum-dot part;
   wherein the red quantum-dot part and the green quantum-dot part comprise infrared quantum-dot materials;
   each said infrared quantum-dot materials comprises a quantum-dot core and a stabilizer wrapping the quantum-dot core, the quantum-dot core is quantum-dot inorganic matter, and the stabilizer is organic matter;
   the infrared quantum-dot materials have a diameter of 1-10 nm;
   wherein the infrared quantum-dot materials are mixed in raw materials of the red quantum-dot part and raw materials of the green quantum-dot part, with no infrared quantum-dot materials in raw materials of the blue quantum-dot part;
   the quantum-dot light conversion layer further comprises a first infrared quantum-dot material layer and a second infrared quantum-dot material layer, the first infrared quantum-dot material layer is sandwiched between the glass substrate and the red quantum-dot part, the second infrared quantum-dot material layer is sandwiched between the glass substrate and the green quantum-dot part.

2. The substrate according to claim 1, wherein the infrared quantum-dot materials in the raw materials of the red quantum-dot part have a mass fraction of 0.1%-20%, and the infrared quantum-dot materials in the raw materials of the green quantum-dot part have a mass fraction of 0.1%-20%.

3. The substrate according to claim 1, wherein a thickness of the first infrared quantum-dot material layer and a thickness of the second infrared quantum-dot material layer can be adjusted by regulating a concentration and/or granularity of the infrared quantum-dot materials.

4. The substrate according to claim 1, wherein a thickness of the first infrared quantum-dot material layer and a thickness of the second quantum-dot material layer are not over 2 μm.

5. A quantum-dot color filter substrate, wherein the quantum-dot color filter substrate comprises:
   a glass substrate;
   a quantum-dot light conversion layer, wherein the quantum-dot light conversion layer is formed on the glass substrate and comprises a plurality of quantum-dot parts arrayed in sequence, and the quantum-dot parts comprise a red quantum-dot part, a green quantum-dot part and a blue quantum-dot part;
   wherein the red quantum-dot part and the green quantum-dot part comprise infrared quantum-dot materials;
   wherein the infrared quantum-dot materials are mixed in raw materials of the red quantum-dot part and raw materials of the green quantum-dot part, with no infrared quantum-dot materials in raw materials of the blue quantum-dot part;

the quantum-dot light conversion layer further comprises a first infrared quantum-dot material layer and a second infrared quantum-dot material layer, the first infrared quantum-dot material layer is sandwiched between the glass substrate and the red quantum-dot part, the second infrared quantum-dot material layer is sandwiched between the glass substrate and the green quantum-dot part.

6. The substrate according to claim 5, wherein the infrared quantum-dot materials in the raw materials of the red quantum-dot part have a mass fraction of 0.1%-20%, and the infrared quantum-dot materials in the raw materials of the green quantum-dot part have a mass fraction of 0.1%-20%.

7. The substrate according to claim 5, wherein a thickness of the first infrared quantum-dot material layer and a thickness of the second infrared quantum-dot material layer can be adjusted by regulating a concentration and/or granularity of the infrared quantum-dot materials.

8. The substrate according to claim 5, wherein a thickness of the first infrared quantum-dot material layer and a thickness of the second quantum-dot material layer are not over 2 μm.

9. The substrate according to claim 5, wherein each said infrared quantum-dot materials comprises a quantum-dot core and a stabilizer wrapping the quantum-dot core, the quantum-dot core is quantum-dot inorganic matter, and the stabilizer is organic matter.

10. The substrate according to claim 9, wherein the quantum-dot core comprise one or a combination of more than two selected from Cd, Cu, Ag, Pb, Si and Zn quantum-dot inorganic compounds, and the stabilizer comprises one or a combination of more than two selected from mercaptoacetic acid, mercaptoethylamine and cysteine.

11. The substrate according to claim 5, wherein the infrared quantum-dot materials have a diameter of 1-10 nm.

12. A display panel, wherein the display panel comprises a quantum-dot color filter substrate, and the quantum-dot color filter substrate comprises:

a glass substrate;

a quantum-dot light conversion layer, wherein the quantum-dot light conversion layer is formed on the glass substrate and comprises a plurality of quantum-dot parts arrayed in sequence, and the quantum-dot parts comprise a red quantum-dot part, a green quantum-dot part and a blue quantum-dot part;

wherein the red quantum-dot part and the green quantum-dot part comprise infrared quantum-dot materials;

wherein the infrared quantum-dot materials are mixed in raw materials of the red quantum-dot part and raw materials of the green quantum-dot part, with no infrared quantum-dot materials in raw materials of the blue quantum-dot part;

the quantum-dot light conversion layer further comprises a first infrared quantum-dot material layer and a second infrared quantum-dot material layer, the first infrared quantum-dot material layer is sandwiched between the glass substrate and the red quantum-dot part, the second infrared quantum-dot material layer is sandwiched between the glass substrate and the green quantum-dot part.

13. The display panel according to claim 12, wherein a thickness of the first infrared quantum-dot material layer and a thickness of the second quantum-dot material layer are not over 2 μm.

14. The display panel according to claim 12, wherein each said infrared quantum-dot materials comprises a quantum-dot core and a stabilizer wrapping the quantum-dot core, the quantum-dot core is quantum-dot inorganic matter, and the stabilizer is organic matter.

* * * * *